United States Patent
Boileau

(10) Patent No.: US 12,454,927 B2
(45) Date of Patent: Oct. 28, 2025

(54) AIRCRAFT PROPULSION ASSEMBLY COMPRISING AN ACTUATOR CONNECTED TO A STRUCTURAL ARM SUCH AS AN OUTLET GUIDE VANE

(71) Applicant: SAFRAN NACELLES, Gonfreville-l'Orcher (FR)

(72) Inventor: Patrick André Boileau, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/556,702

(22) PCT Filed: May 12, 2022

(86) PCT No.: PCT/FR2022/050912
§ 371 (c)(1),
(2) Date: Oct. 23, 2023

(87) PCT Pub. No.: WO2022/238664
PCT Pub. Date: Nov. 17, 2022

(65) Prior Publication Data
US 2024/0240599 A1    Jul. 18, 2024

(30) Foreign Application Priority Data
May 14, 2021   (FR) ......................... 2105075

(51) Int. Cl.
*F02K 1/76* (2006.01)
*F02K 1/72* (2006.01)

(52) U.S. Cl.
CPC ............... *F02K 1/763* (2013.01); *F02K 1/72* (2013.01); *F05D 2260/30* (2013.01); *F05D 2270/64* (2013.01)

(58) Field of Classification Search
CPC ... F02K 1/72; F02K 1/763; F02K 1/80; F01D 25/243; F01D 25/28; F05D 2260/30
See application file for complete search history.

(56) References Cited

U.S. PATENT DOCUMENTS

| | | |
|---|---|---|
| 3,262,270 A | 7/1966 | Beavers |
| 3,500,645 A | 3/1970 | Hom |
| 8,418,436 B2 | 4/2013 | Pero et al. |
| (Continued) | | |

FOREIGN PATENT DOCUMENTS

FR    3078108 A1 *   8/2019  ............... B64C 7/02

OTHER PUBLICATIONS

International Search Report mailed on Sep. 16, 2022 in PCT/FR2022/050912 filed on May 12, 2022 (citing references 1-6 therein, 2 pages).

(Continued)

*Primary Examiner* — Andrew H Nguyen
(74) *Attorney, Agent, or Firm* — Oblon, McClelland, Maier & Neustadt, L.L.P.

(57) ABSTRACT

A propulsion assembly including an actuator connected to an outer casing of a turbomachine by a connecting structure. The connecting structure is fastened in line with a structural arm connecting the outer casing to a hub of the turbomachine, with a common fastening device, with the result that the arm can withstand loading forces of the actuator while relieving the outer casing.

10 Claims, 6 Drawing Sheets

(56) References Cited

U.S. PATENT DOCUMENTS

| | | | | |
|---|---|---|---|---|
| 2010/0257841 A1* | 10/2010 | Pero | ................... | F02K 1/70 |
| | | | | 60/226.3 |
| 2012/0005999 A1 | 1/2012 | Pero et al. | | |
| 2012/0325930 A1 | 12/2012 | Pero et al. | | |
| 2016/0131082 A1* | 5/2016 | Gormley | ................... | F02K 1/72 |
| | | | | 239/265.19 |
| 2016/0201561 A1* | 7/2016 | Lussier | ................... | F02C 7/20 |
| | | | | 415/213.1 |
| 2020/0378341 A1* | 12/2020 | Boileau | ................... | F02C 7/20 |

OTHER PUBLICATIONS

Preliminary French Search Report dated Nov. 29, 2021 in French Application 2105075 filed on May 14, 2021 (citing references 1-6 therein, 9 pages, with Translation of Categories).

* cited by examiner

AIRCRAFT PROPULSION ASSEMBLY COMPRISING AN ACTUATOR CONNECTED TO A STRUCTURAL ARM SUCH AS AN OUTLET GUIDE VANE

TECHNICAL FIELD

The invention relates to the field of aircraft propulsion assemblies incorporating a thrust reverser.

The invention is of particular interest for sliding cascade reversers.

STATE OF PRIOR ART

The high bypass ratio turbomachines currently in service in the aeronautical sector generally comprise a fan casing from which an intermediate casing axially extends at the rear.

The term "outer casing" is used here to refer to the assembly formed by the fan casing and the intermediate casing, or only the fan casing when the turbomachine does not comprise an intermediate casing.

In a conventional propulsion unit equipped with a sliding cascade reverser, as described for example in document FR2999239A1, the cascades extend around the outer casing when the reverser is in direct thrust configuration.

In order to avoid excessive loading of the shroud formed by the outer casing, reverser actuators are generally connected to structural flanges formed by axial ends of the fan casing and/or intermediate casing.

A fastening solution known in the state of prior art consists in mounting such an actuator onto a connecting structure forming a beam fastened on the one hand to a front flange and on the other hand to a rear flange of the fan casing.

Such a connecting structure may prove incompatible with contemporary propulsion assembly architectures in which the space available around the outer casing is reduced.

Besides, there is a need to relieve the outer casing, in particular from mechanical loads from the reverser.

DISCLOSURE OF THE INVENTION

The aim of the invention is to provide a propulsion assembly equipped with a reverser having an axially movable structure which is compatible with contemporary architectures and which makes it possible to reduce or optimise loading of the outer casing, in particular when the movable structure of the reverser is axially rearwardly biased.

To this end, one object of the invention is an aircraft propulsion assembly comprising a fixed structure, a movable thrust reversing structure and a linear actuator connected to the movable structure so as to be able to translationally move it relative to the fixed structure along a longitudinal axis, the fixed structure comprising an outer casing extending about the longitudinal axis, a hub, at least one structural arm connecting the outer casing to the hub, a connecting structure connecting the actuator to the outer casing and devices for fastening the connecting structure to the outer casing, the movable structure comprising deflection cascades, wherein the fastening devices are positioned axially between a leading edge and a trailing edge of a head of the arm.

The invention enables at least part of the forces of the actuator to be supported by the at least one arm, by passing them directly into the latter via the connecting structure and the fastening means.

This relieves the outer casing, especially when the movable structure is axially rearwardly biased, that is, in thrust reversing configuration, and when the movable structure moves towards this configuration.

The invention also enables the overall size of pieces of the propulsion assembly, especially the connecting structure, to be reduced around the outer casing.

The invention thus enables the performance of the propulsion assembly to be improved and is compatible with contemporary high bypass ratio architectures.

In one embodiment, the arm forms an outlet guide vane (OGV).

In a preferred embodiment, the actuator is connected to a rear frame of the cascades.

The movable structure preferably comprises one or more cowls.

The actuator can be connected to this movable cowl or cowls.

Preferably, the cowl or cowls are integral with the rear frame of the cascades.

The actuator is preferably a cylinder.

In one embodiment, the cylinder is telescopic.

The actuator can be configured to radially extend beneath the cascades or, alternatively, within their thickness.

In one alternative embodiment, the outer casing comprises a fan casing and an intermediate casing.

According to this first alternative, the arm is preferably fastened to the intermediate casing.

Alternatively, the arm can be fastened to the fan casing.

In a second alternative embodiment, the outer casing comprises a fan casing and has no intermediate casing.

In one embodiment, the fastening means radially extend through a shroud of the outer casing.

Advantageously, the fastening means can be configured to fasten the arm to the outer casing.

This makes it possible, especially, to pool the fastening means and improve the transmission of forces between the arm and the connecting structure.

By way of example, the fastening means may comprise screws and/or studs and/or other types of fastening members.

In one embodiment, the connecting structure comprises a support element integral with the outer casing.

The support element may be an interface piece fastened to the outer casing by the engine manufacturer and configured so that another piece of the connecting structure, such as a fitting, can be fastened to it. Thus, it is possible to mount or replace other parts of the connecting structure and the nacelle without affecting the turbomachine, and in particular fastening said support element to the turbomachine, once the latter has been assembled and tested.

The connecting structure preferably comprises a fitting fastened to the support element.

In one embodiment, the propulsion assembly comprises a gimbal configured to hinge the actuator to the fitting or to another piece formed by the connecting structure.

In one embodiment, the fitting is fastened to a flange of the outer casing.

Thus, in one embodiment, the fitting can be fastened on the one hand to a flange of the outer casing and on the other hand to a support element as described above.

More generally, the connecting structure can be fastened to several parts of the outer casing and/or the arm, for example in order to distribute the forces of the actuator and improve the corresponding force path(s).

The connecting structure can have many geometries.

For example, the fitting of this connecting structure can form a hinge clevis extending in line with the arm.

In another example, the fitting of the connecting structure may form a beam extending longitudinally.

In one embodiment, the connecting structure comprises a front part connected to the actuator and a rear part connected to the outer casing so that the actuator extends in a cantilevered way.

Further advantages and characteristics of the invention will become apparent upon reading the following detailed, non-limiting description.

BRIEF DESCRIPTION OF THE DRAWINGS

The following detailed description refers to the appended drawings in which.

DETAILED DESCRIPTION OF EMBODIMENTS

Figure 1:
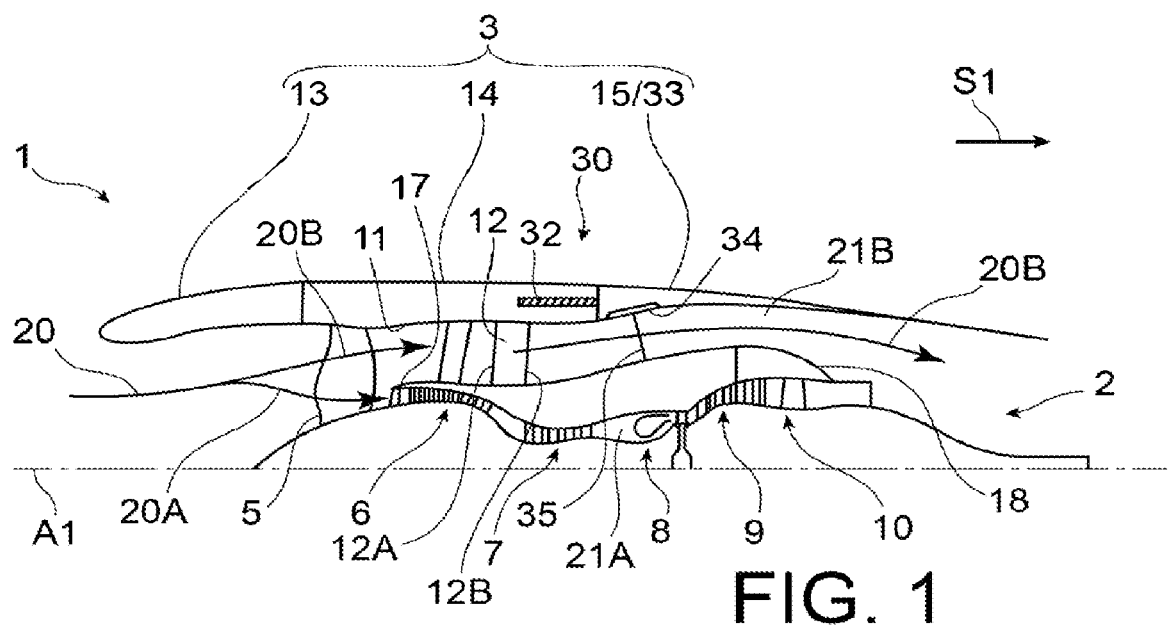
FIG. 1 is a schematic longitudinal cross-sectional half-view of a propulsion assembly in accordance with the invention, comprising a thrust reverser in direct thrust configuration.
Figure 2:
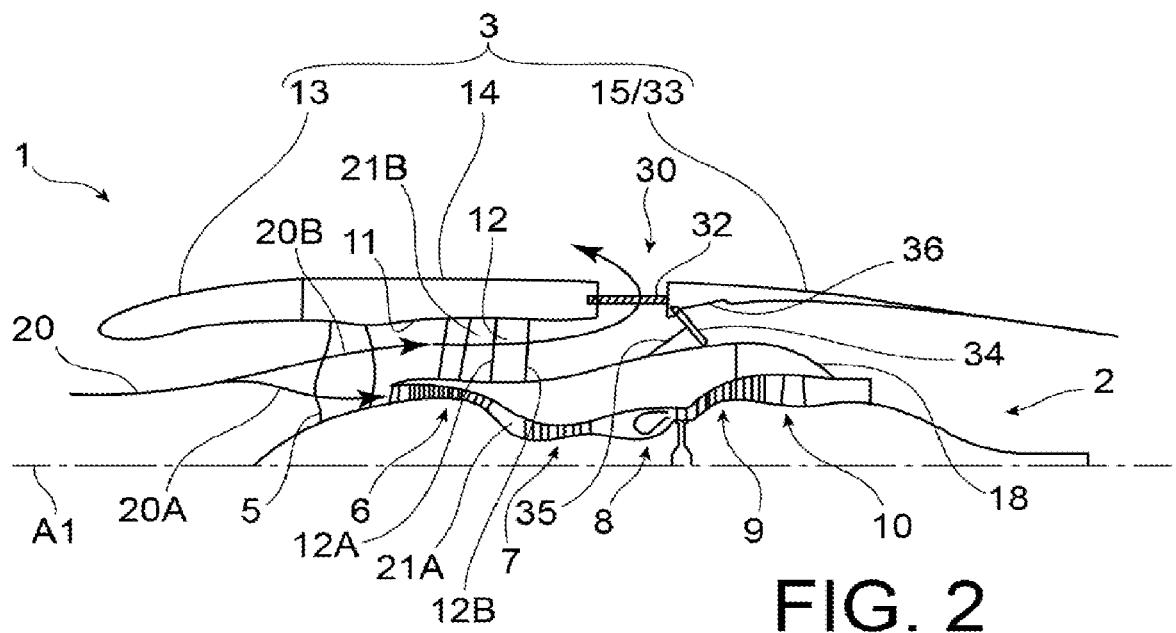
FIG. 2 is a schematic longitudinal cross-sectional half-view of the propulsion assembly of FIG. 1, with the reverser in thrust reversing configuration.

FIGS. 1 and 2 represent an aircraft propulsion system 1 having a central longitudinal axis A1.

Hereafter, the terms "forward" and "rearward" are defined in relation to a main direction S1 of gas flow through the propulsion assembly 1 along the axis A1 when it generates thrust.

The propulsion assembly 1 comprises a turbomachine 2, a nacelle 3 and a pylon (not represented) for connecting the propulsion assembly 1 to a wing of the aircraft.

In this example, the turbomachine 2 is a turbofan engine comprising, from front to rear, a fan 5, a low-pressure compressor 6, a high-pressure compressor 7, a combustion chamber 8, a high-pressure turbine 9 and a low-pressure turbine 10.

The compressors 6 and 7, the combustion chamber 8 and the turbines 9 and 10 form a gas generator.

The turbojet engine 2 is fitted with an outer casing 11 surrounding the fan 5 and connected to a hub of the turbojet engine 2 by structural arms 12 which radially extend through the secondary flow path 21B.

In a manner known per se, the arms 12 are circumferentially distributed about the axis A1 and are each fastened by a shank to said hub and by a head to the outer casing 11, especially so as to pass forces between the gas generator and the pylon of the propulsion assembly 1.

In this example, the arms 12 form outlet guide vanes enabling the secondary flow 20B to be straightened behind the fan 5.

To this end, each of the arms 12 comprises a front end 12A forming a leading edge and a rear end 12B forming a trailing edge.

The nacelle 3 comprises a front section forming an air inlet 13, a middle section which includes fan cowls 14 enclosing the outer casing 11 and a rear section 15.

In operation, an air flow 20 enters the propulsion assembly 1 through the air inlet 13, passes through the fan 5 and then divides into a primary flow 20A and a secondary flow 20B. The primary flow 20A flows in a primary gas circulation flow path 21A passing through the gas generator. The secondary flow 20B flows in a secondary flow path 21B surrounding the gas generator.

The secondary flow path 21B is radially inwardly delimited by a fixed inner fairing 18 enclosing the gas generator and radially outwardly by the outer casing 11 and, in the configuration of FIG. 1, by reverser cowls 33 forming the rear section 15 of the nacelle 3 (see below).

The nacelle 3 comprises a thrust reverser 30 forming a movable structure relative to the turbojet engine 2 and in particular relative to the outer casing 11 which forms a fixed structure of the propulsion assembly 1.

In this example, the movable structure of the reverser 30 comprises deflection cascades 32, the aforementioned cowls 33, shutter flaps 34 and connecting rods 35.

FIG. 1 shows the reverser 30 in a direct thrust configuration.

In this configuration, the cowls 33 are in a closed position, or forward position, in which they substantially bear on a rear end of the middle section and in which the cascades 32 are housed in a space delimited radially by the outer casing 11 on the one hand and by the fan cowls 14 on the other hand.

In the direct thrust configuration, the flaps 34 are retracted within a cavity 36 (see FIG. 2) formed by the cowls 33.

The reverser 30 thus enables the secondary flow 20B to be channelled rearward of the propulsion unit 1 so as to generate thrust.

FIG. 2 shows the reverser 30 in a thrust reversing configuration.

In this configuration, the cowls 33 are in an open position, or backward position, in which they are longitudinally remote from the middle section so as to define a radial opening of the secondary flow path 21B. The cascades 32 extend through this radial opening.

In the thrust reversing configuration, the flaps 34 are extended radially in the secondary flow path 21B so as to direct the secondary flow 20B towards the cascades 32, which enable the flow thus redirected to be oriented forward of the propulsion unit 1 in order to generate a counter-thrust.

The invention more specifically relates to the actuation of the movable structure of the reverser 30.

Figure 3:
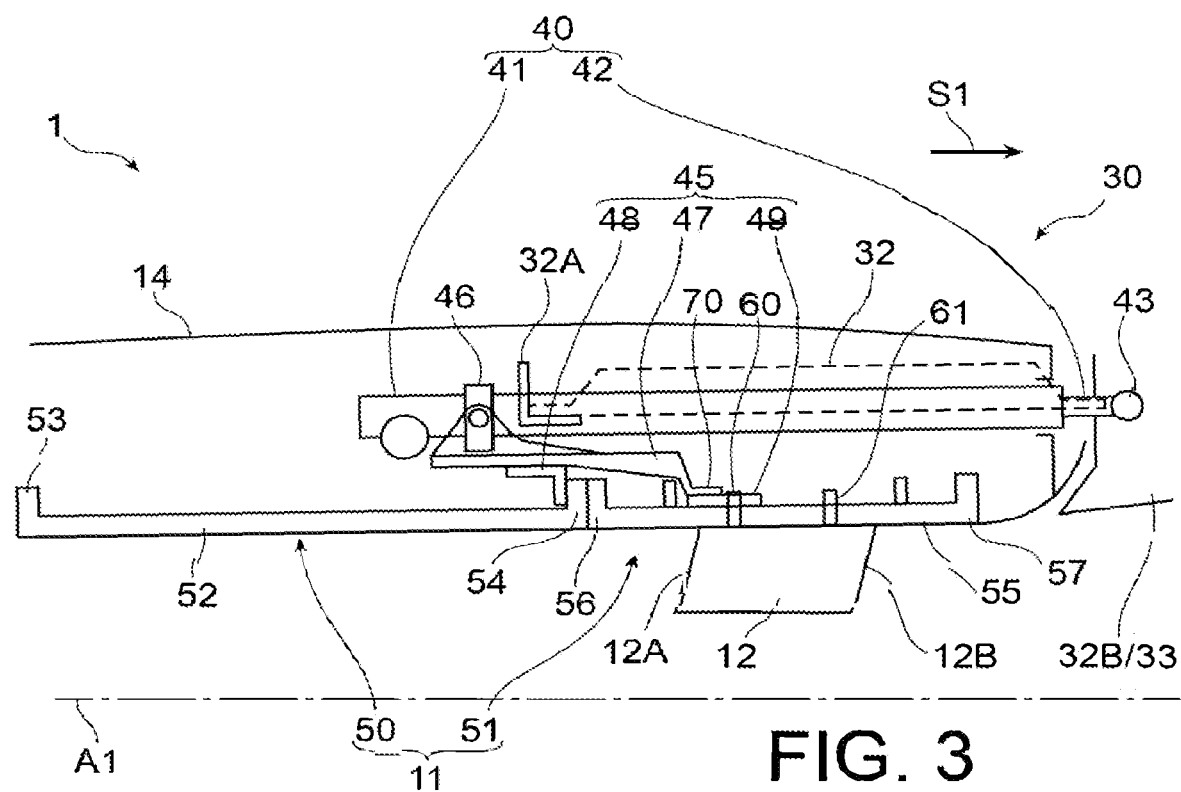
FIG. 3 is a schematic partial view of a reverser actuation device in accordance with the invention, comprising a cylinder and a connecting structure according to a first embodiment, the cylinder being in the retracted position.
Figure 4:
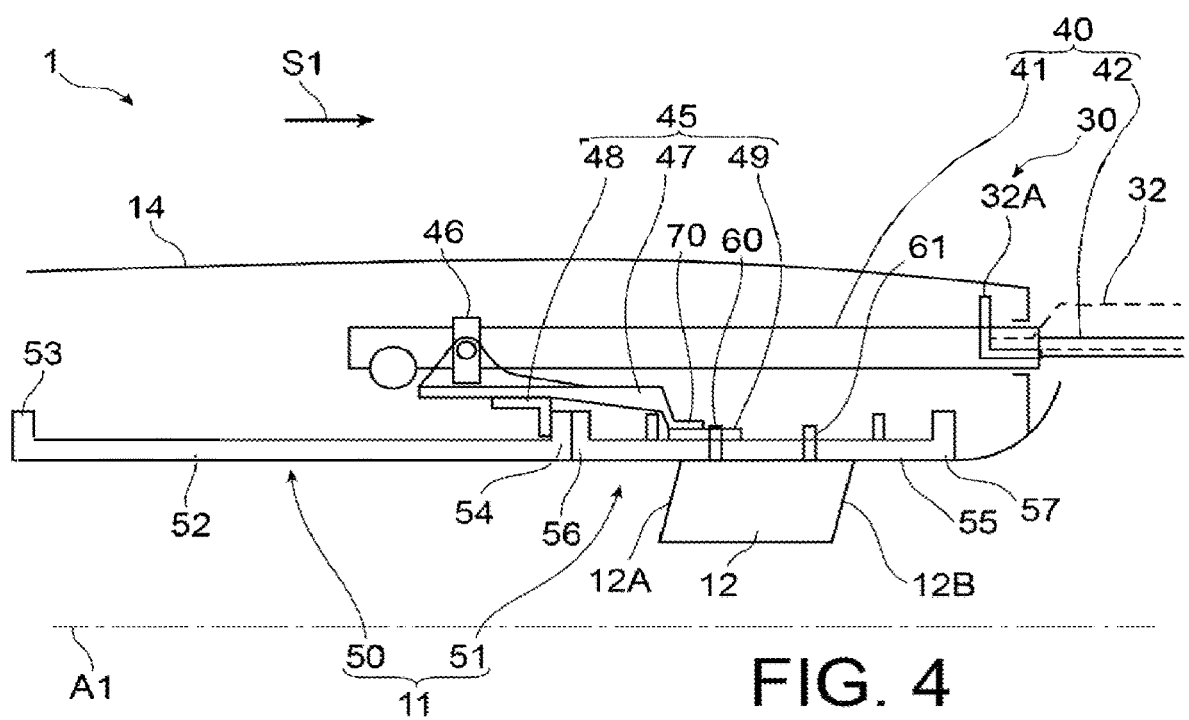
FIG. 4 is a partial schematic view of the actuation device of FIG. 3, with the cylinder in the extended position.
Figure 5:
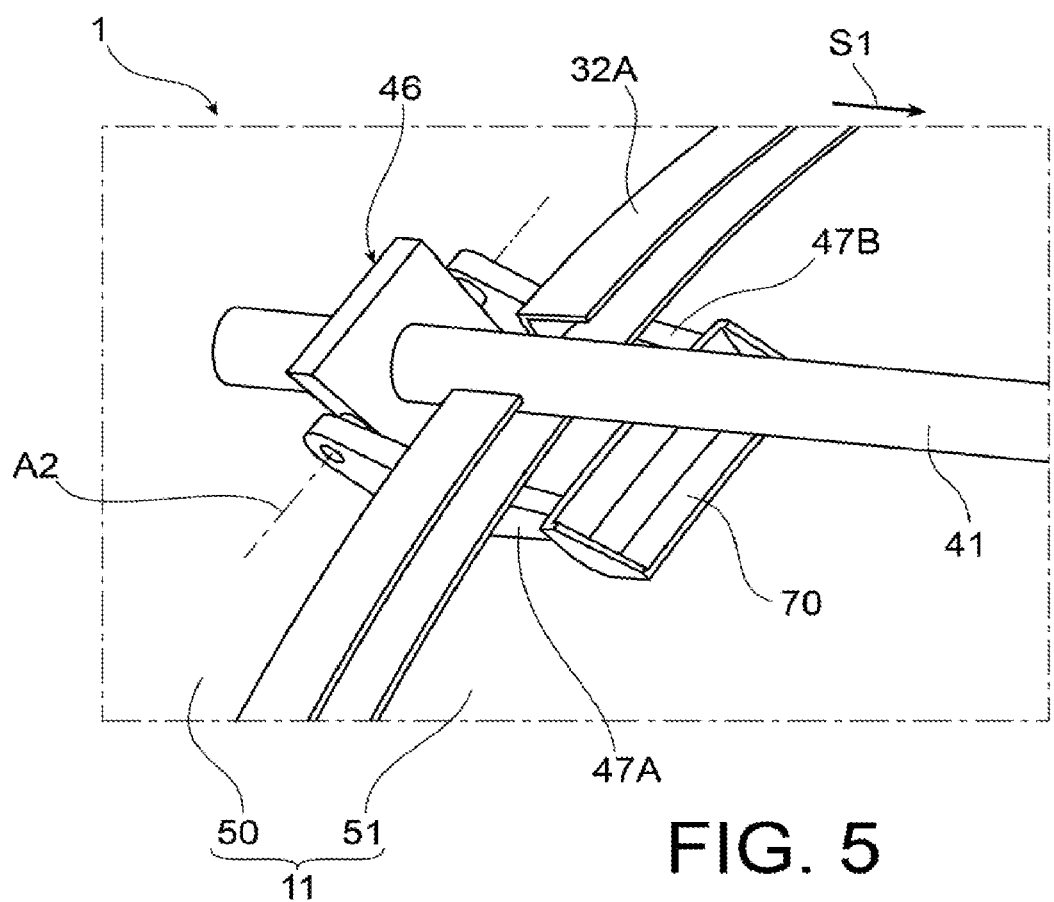
FIG. 5 is a partial schematic perspective view of the actuation device of FIG. 3.

FIGS. 3 to 5 show an actuation device according to a first embodiment.

This actuation device comprises a cylinder 40 comprising a body 41 and a rod 42 being movable relative to the body 41 between a retracted position, illustrated in FIG. 3, and an extended position, illustrated in FIG. 4.

The cylinder 40 is a hydraulic cylinder.

In this example, the cylinder 40 is telescopic, making it possible to compensate for the phenomena of deflection and expansion of the movable structure compared with a non-telescopic cylinder. In one alternative embodiment, the cylinder 40 may be non-telescopic.

The actuation device may also include a buckling limitation device (not represented).

With reference to FIGS. 3 and 4, the rod 42 is moved between the retracted and extended positions according to an actuation direction parallel to the axis A1. In one alternative not represented, the direction of actuation may be oblique relative to the axis A1.

The rod 42 of the cylinder 40 comprises a free end 43 connected to the movable structure of the reverser 30.

In this example, the free end 43 of the rod 42 is hinged to a rear frame 32B of the cascades 32 which is integral with the cowls 33 or one of the cowls 33, it being understood that the reverser 30 may have a conventional C, D or O architecture.

In this example, the body 41 of the cylinder 40 is hinged to a connecting structure 45 through a gimbal 46 about a hinge axis A2 passing through a plane orthogonal to the axis A1 (see FIG. 5).

In this example, the gimbal 46 is mounted to a part of the body 41 located in proximity to a front end of the cylinder 40, opposite to the free end 43 of the rod 42, so as to enclose the body 41 of the cylinder 40.

The cylinder 40 radially extends between an inner surface and an outer surface of the cascades 32, that is, within their thickness.

In one alternative not represented, the cylinder 40 radially inwardly extends relative to such an inner surface of the cascades 32.

The gimbal 46 extends at the front of the cascades 32, more precisely at a position axially forward relative to a front frame 32A of the cascades 32, including when the cylinder 40 is in a retracted position (FIG. 3).

The gimbal 46 and the connecting structure 45 are thus configured to extend outside the volume of the cascades 32, which increases their useful deflection surface.

The connecting structure 45 in FIGS. 3 to 5 comprises a fitting 47 and two support elements 48 and 49 for this fitting 47.

The support elements 48 and 49 are fastened to the outer casing 11.

In this embodiment, the outer casing 11 comprises a fan casing 50 and an intermediate casing 51 forming an axial extension of the fan casing 50.

In a manner known per se, the fan casing 50 forms a shroud 52 comprising, at its axial ends, a front flange 53 and a rear flange 54. Similarly, the intermediate casing 51 forms a shroud 55 comprising a front flange 56 and a rear flange 57 at its axial ends.

The rear flange 54 of the fan casing 50 and the front flange 56 of the intermediate casing 51 are connected to each other by fastening means (not represented) such as bolts or rivets.

With reference to FIG. 3, the head of each of the arms 12, that is, their end radially outwardly relative to the axis A1, is arranged radially opposite an inner surface of the shroud 55 formed by the intermediate casing 51 and is fastened to this shroud 55 by fastening means 60 and 61 such as studs or screws.

Each of the arms 12 as well as their leading edge 12A and trailing edge 12B extend axially between the front 56 and rear 57 flanges of the intermediate casing 51.

In this example, the fastening means 60 form a first row and are positioned in axial proximity to the leading edge 12A of the arms 12. The fastening means 61 form a second row and are positioned in axial proximity to the trailing edge 12B of the arms 12, axially rearward relative to the fastening means 60.

Each of the fastening means 60 and 61 radially extends through the shroud 55 of the intermediate casing 51.

In this non-limiting example, each of the arms 12 is thus fastened to the intermediate casing 51 at the front by two fastening means 60 and at the rear by two fastening means 61.

The support element 49 of the connecting structure 45 is arranged on an outer surface of the shroud 55 of the intermediate casing 51.

In this example, the support element 49 is circumferentially aligned with one of the arms 12 and extends axially between the leading edge 12A and the trailing edge 12B of the head of this arm 12. In the remainder of the description, reference is made by default to this arm 12.

The support element 49 is fastened to the shroud 55 by the same fastening means 60 that secure the arm 12 to the intermediate casing 51.

In this example, the support element 48 is L-shaped, forming a radial lug and an axial lug.

The radial lug of the support element 48 is arranged against a front surface of the rear flange 54 of the fan casing 50 and is fastened to the latter and to the front flange 56 of the intermediate casing 51 by fastening means such as screws or bolts (not represented) passing through these different pieces axially.

In this example, the support elements 48 and 49 form interface pieces which are intended to remain integral with the outer casing 11 in the event of maintenance work being carried out on the actuation device. To this end, the support elements 48 and 49 are configured so that the fitting 47 can be removably fastened to them, possibly with the destruction of the corresponding fastening means (not represented).

With reference to FIG. 5, the fitting 47 extends longitudinally to form a double beam comprising two arms 47A and 47B extending circumferentially on either side of the cylinder 40 (see FIG. 5).

A front part of the arms 47A and 47B is hinged to the gimbal 46.

Each of the arms 47A and 47B of the fitting 47 forms a surface arranged opposite said axial lug of the support element 48. The arms 47A and 47B are secured to this axial lug of the support element 48 by fastening means such as screws or bolts (not represented).

The fitting 47 comprises a rear part forming a rear lug 70 extending circumferentially so as to connect the arms 47A and 47B to each other (see FIG. 5).

The rear lug 70 of the fitting 47 is arranged on an outer surface of the support element 49 and is fastened to this support element 49 by fastening means such as screws or studs (not represented) which are in this example different from the aforementioned fastening means 60.

Of course, the fitting 47 may have a different geometry to that illustrated in FIG. 5 and form, for example, a beam having a single arm (not represented) extending radially under the cylinder 40.

In this example, the means for fastening the fitting 47 to the support element 49 are arranged axially in proximity to the leading edge 12A of the head of the arm 12 (see FIG. 3).

The connecting structure 45 thus makes it possible to connect the cylinder 40 to the outer casing 11 so as to define a main force path passing through the arm 12. In particular, when the movable structure of the reverser 30 is in thrust reversing configuration or is moved towards this configuration, the movable structure exerts an axial force which is supported by the arm 12, on the cylinder 40, this force passing through the fitting 47, the support element 49 and the fastening means 60.

The invention thus makes it possible to reduce the loading on the outer casing 11 and a fortiori on the shroud 52 of the fan casing 50, which is likely to deform in the event of one or more blades of the fan 5 breaking. In this respect, the body 41 of the cylinder 40 and the fitting 47 are cantilever-mounted to the fan casing 50 due to the relative arrangement of the support elements 48 and 49 (see FIG. 3).

The fitting 47 acts as an axial force take-up beam supported by the arm 12.

Figure 6:
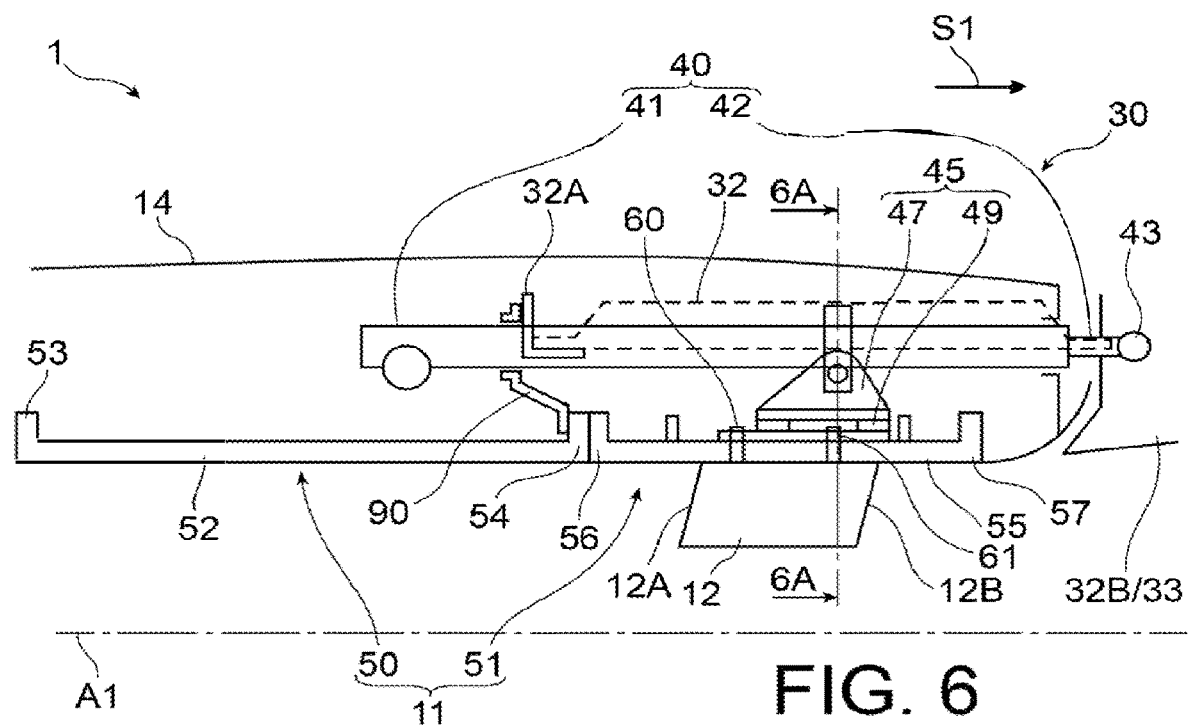
FIG. 6 is a partial schematic view of a reverser actuation device in accordance with the invention, comprising a cylinder and a connecting structure according to a second embodiment, the cylinder being in the retracted position.
Figure 6A:
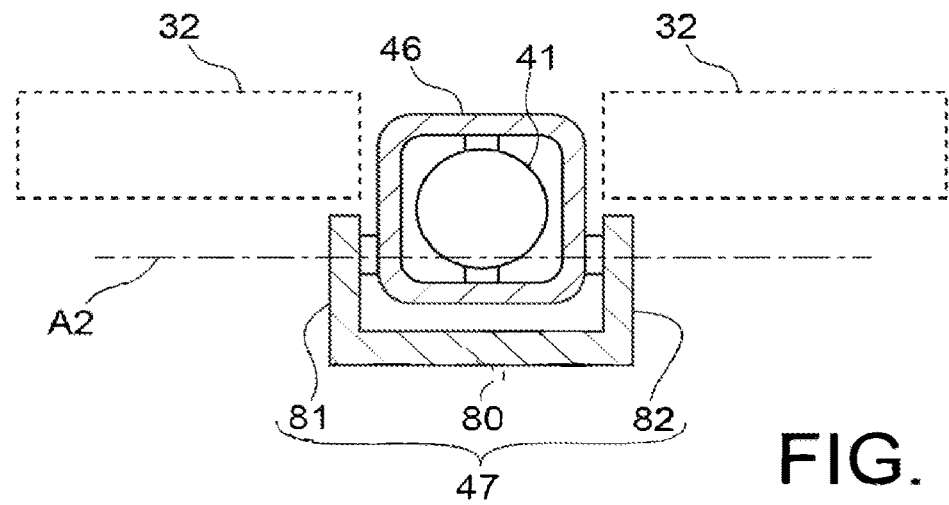
FIG. 6A is a partial schematic transverse cross-sectional view of the actuation device of FIG. 6.

FIGS. 6 and 6A show an actuation device according to a second embodiment.

This second embodiment is described only according to its differences from the first embodiment. The preceding description applies by analogy in view of these differences.

In this example, the connecting structure 45 comprises a fitting 47 and a single support element 49.

The support element 49 is fastened to the shroud 55 by the same fastening means 60 and 61 that secure the arm 12 to the intermediate casing 51.

The fitting 47 of the connecting structure 45 has a U-shaped section (see FIG. 6A) comprising a base 80 and two radial lugs 81 and 82.

The base 80 of the fitting 47 is arranged on the support element 49 and fastened to the same by fastening means (not represented) such as screws.

With reference to FIG. 6A, which shows the actuation device along a section plane passing through the axis A2 for hinging the body 41 of the cylinder 40 to the fitting 47, the lugs 81 and 82 extend circumferentially on either side of the gimbal 46 and are connected to the gimbal 46 so that the axis A2 is radially off-centre relative to the axis for actuating the cylinder 40 so that the fitting 47 extends outside the volume of the cascades 32.

The fitting 47 and more generally the connecting structure 45 thus extend in line with the arm 12 so that the main force path is substantially shorter than in the first embodiment.

In this example, the gimbal 46 is mounted to a middle part of the body 41 of the cylinder 40 which is close to the centre of gravity of the cylinder 40.

This arrangement makes it possible to improve the take-up of forces from the cylinder 40 by the arm 12.

This arrangement also reduces the risk of buckling for the cylinder 40 and therefore reduces its size and the mass of the actuation device.

In this example, a retention structure 90 is fastened to the rear flange 54 of the fan casing 50 so as to form an axial stop for the cylinder 40 enabling it to be retained, for example, in the event of the blade(s) of the fan 5 breaking.

Figure 7:
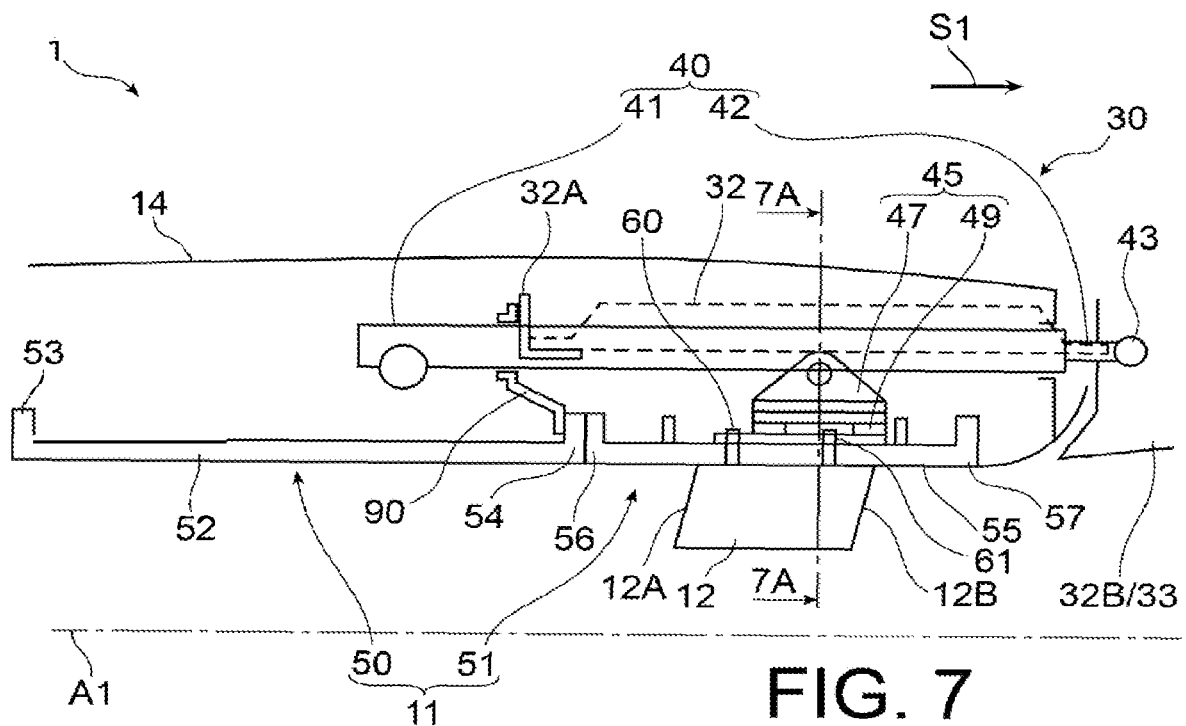
FIG. 7 is a partial schematic view of a reverser actuation device in accordance with the invention, comprising a cylinder and a connecting structure according to a third embodiment, the cylinder being in the retracted position.
Figure 7A:
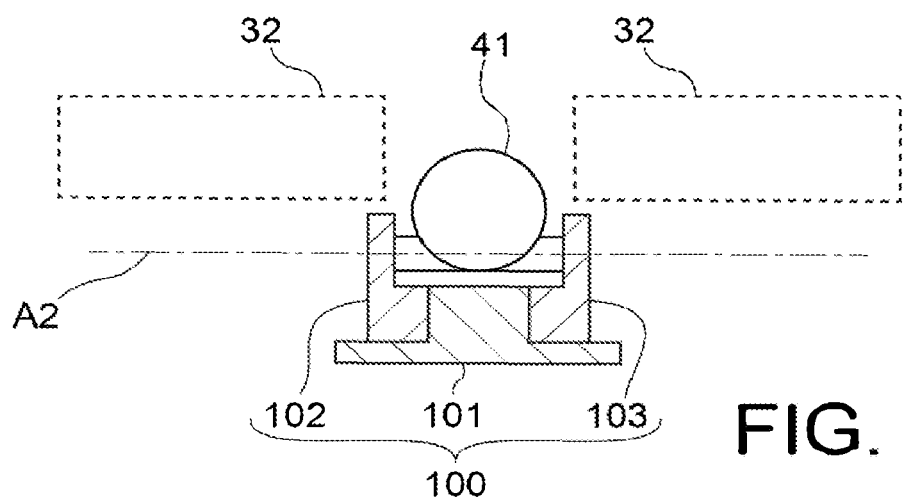
FIG. 7A is a partial schematic transverse cross-sectional view of the actuation device of FIG. 7.

FIGS. 7 and 7A show an actuation device according to a third embodiment.

This third embodiment is described only according to its differences from the second embodiment. The preceding description applies by analogy, in view of these differences.

In this embodiment, the body 41 of the cylinder 40 is hinged to the fitting 47 by a structure 100 of the mount type.

With reference to FIG. 7A, which shows the actuation device of FIG. 7 along a section plane passing through the axis A2 for hinging the body 41 of the cylinder 40 to the fitting 47, the mount 100 comprises a base 101 and fitting elements 102 and 103 extending on either side of the body 41 of the cylinder 40.

The base 101 and the fitting elements 102 and 103 radially extend beneath the cascades 32, outside the volume they define, which makes it possible to increase their effective deflection surface.

Such a mount 100 is also more compact than a gimbal 46 such as those illustrated in FIGS. 3 and 6A.

The invention is not limited to the embodiments described above. Thus, for example, the outer casing 11 may be devoid of an intermediate casing 51, the arms 12 may be connected to the fan casing 50 and the connecting structure 45 may be connected to the fan casing 50 so as to transmit the loads of the actuation device to one of these arms 12.

As a further example, in each of the embodiments described above, the actuator 40 may be connected to the connecting structure 45 by a hinge member different from the gimbal 46 of FIGS. 3 to 6A and the mount 100 of FIG. 7A.

Very preferably, as discussed previously, in particular with reference to FIG. 3, the gimbal 46 supporting the cylinder is arranged upstream of the cascades 32 and the structural arm 12 of the casing.

The embodiments described above can furthermore be combined. For example, in one alternative not represented, the gimbal 46 of the actuation device of FIG. 3 can be replaced by a mount 100 similar to that of FIG. 7A, the geometry of the fitting 47 being adapted accordingly.

Of course, the actuation device may comprise a plurality of actuators 40 and corresponding connecting structures 45 as described above, each cylinder 40 can be configured to define a main force path passing through a respective arm 12 of the propulsion assembly 1.

The invention claimed is:

1. An aircraft propulsion assembly, comprising:
   a fixed structure,
   a movable thrust reversing structure, and
   a linear actuator connected to the movable structure so as to be able to translationally move the movable structure relative to the fixed structure along a longitudinal axis,
   the fixed structure comprising an outer casing extending about the longitudinal axis, a hub, a structural arm connecting the outer casing to the hub, a connecting structure connecting the actuator to the outer casing, and fastening devices for fastening the connecting structure to the outer casing,
   the movable structure comprising deflection cascades,
   wherein the fastening devices are positioned axially between a leading edge and a trailing edge of a head of the structural arm,
   wherein the connecting structure comprises a support element integral with the outer casing and a fitting fastened to the support element,
   wherein the fitting includes first and second fitting arms extending circumferentially on either side of the actuator, and a rear lug extending circumferentially and connecting rear ends of the first and second fitting arms, and
   wherein front ends of the first and second fitting arms are hinged to a gimbal on which the actuator is mounted.

2. The propulsion assembly according to claim 1, wherein the fastening devices radially extend through a shroud of the outer casing.

3. The propulsion assembly according to claim 1, wherein the fastening devices are configured to fasten the structural arm to the outer casing.

4. The propulsion assembly according to claim 1, wherein the fitting is fastened to a flange of the outer casing.

5. The propulsion assembly according to claim 1, wherein the connecting structure comprises a front part connected to the actuator and a rear part connected to the outer casing so that the actuator extends in a cantilevered way.

6. The propulsion assembly according to claim 1, wherein the structural arm forms an outlet guide vane.

7. The propulsion assembly according to claim 1, wherein the outer casing comprises a fan casing and an intermediate casing, the structural arm being fastened to the intermediate casing.

8. The propulsion assembly according to claim 7, wherein a retention structure is fastened to a rear flange of the fan casing to form an axial stop for the actuator for retaining the actuator in an event of a fan blade breaking.

9. The propulsion assembly according to claim 1, wherein the actuator is a telescopic cylinder.

10. The propulsion assembly according to claim 1, wherein the outer casing comprises a fan casing and an intermediate casing, the structural arm being fastened to the intermediate casing, and the actuator and the fitting being cantilever-mounted to the fan casing.

* * * * *